US012785844B2

(12) United States Patent
Rothermel

(10) Patent No.: US 12,785,844 B2
(45) Date of Patent: Nov. 3, 2026

(54) AS-NEEDED FORWARD ERROR CORRECTION

(71) Applicant: CORNELIS NETWORKS INC., Wayne, PA (US)

(72) Inventor: Brent Rothermel, Wayne, PA (US)

(73) Assignee: Cornelis Networks, Inc., Wayne, PA (US)

( * ) Notice: Subject to any disclaimer, the term of this patent is extended or adjusted under 35 U.S.C. 154(b) by 80 days.

(21) Appl. No.: 18/885,736

(22) Filed: Sep. 15, 2024

(65) Prior Publication Data

US 2026/0081712 A1 Mar. 19, 2026

(51) Int. Cl.
*H04L 1/00* (2006.01)
*H04L 49/55* (2022.01)

(52) U.S. Cl.
CPC .......... *H04L 1/0009* (2013.01); *H04L 49/557* (2013.01)

(58) Field of Classification Search
CPC ............................ H04L 1/0009; H04L 49/557
USPC .......................................................... 714/776
See application file for complete search history.

(56) References Cited

U.S. PATENT DOCUMENTS 8,537,796 B2 * 9/2013 Kim ...................... H04L 1/0042 370/338
2016/0204900 A1 * 7/2016 Tu ......................... H04L 1/0045 714/776
2017/0195037 A1 * 7/2017 Lohman .................. H04L 1/004
2018/0062788 A1 * 3/2018 Mayer ................ H04B 7/18521
2021/0119730 A1 * 4/2021 Das Sharma ....... G06F 11/1004
2025/0330202 A1 * 10/2025 Huang ................ H03M 13/333

* cited by examiner

*Primary Examiner* — James C Kerveros
(74) *Attorney, Agent, or Firm* — H. Artoush Ohanian; Ohanian IP

(57) ABSTRACT

An as-needed forward error correction decoder is provided. Embodiments include a forward error correction pipeline (204), a bypass pipeline (202); and bypass selection logic (208) configured to selectively transmit errorless codewords from the bypass pipeline.

20 Claims, 4 Drawing Sheets

AS-NEEDED FORWARD ERROR CORRECTION

BACKGROUND

High-Performance Computing (HPC) refers to the practice of aggregating computing in a way that delivers much higher computing power than traditional computers and servers. In the context of HPC, network switches play a crucial role in facilitating communication between the various components of a cluster, such as servers, storage devices, and other networking equipment.

Forward error correction (FEC) has become the industry standard for correcting link-level errors in data transmission for high-speed data links. Before data is transmitted, redundant information is added to the original data stream. This redundant data is generated through specific algorithms that allow the receiver to detect and correct certain types of errors without needing retransmission. When the data reaches its destination, the receiver uses the redundant information to check for errors. If errors are detected, the receiver can correct them on the fly without requesting the data to be sent again.

FEC requires a significant amount of latency to correct those errors, which is counter to the low-latency performance goals of high-performance computing. In current FEC systems, all traffic must be routed through a FEC correction block, whether the data has errors or not, thus incurring the latency penalty for all data. It would be advantageous to selectively bypass the FEC correction block for errorless traffic.

BRIEF DESCRIPTION OF THE DRAWINGS

Many aspects of the present disclosure can be better understood with reference to the following drawings. The components in the drawings are not necessarily to scale, with emphasis instead being placed upon illustrating the principles of the disclosure. Moreover, in the drawings, like reference numerals designate corresponding parts throughout the several views.

DETAILED DESCRIPTION

Figure 1:
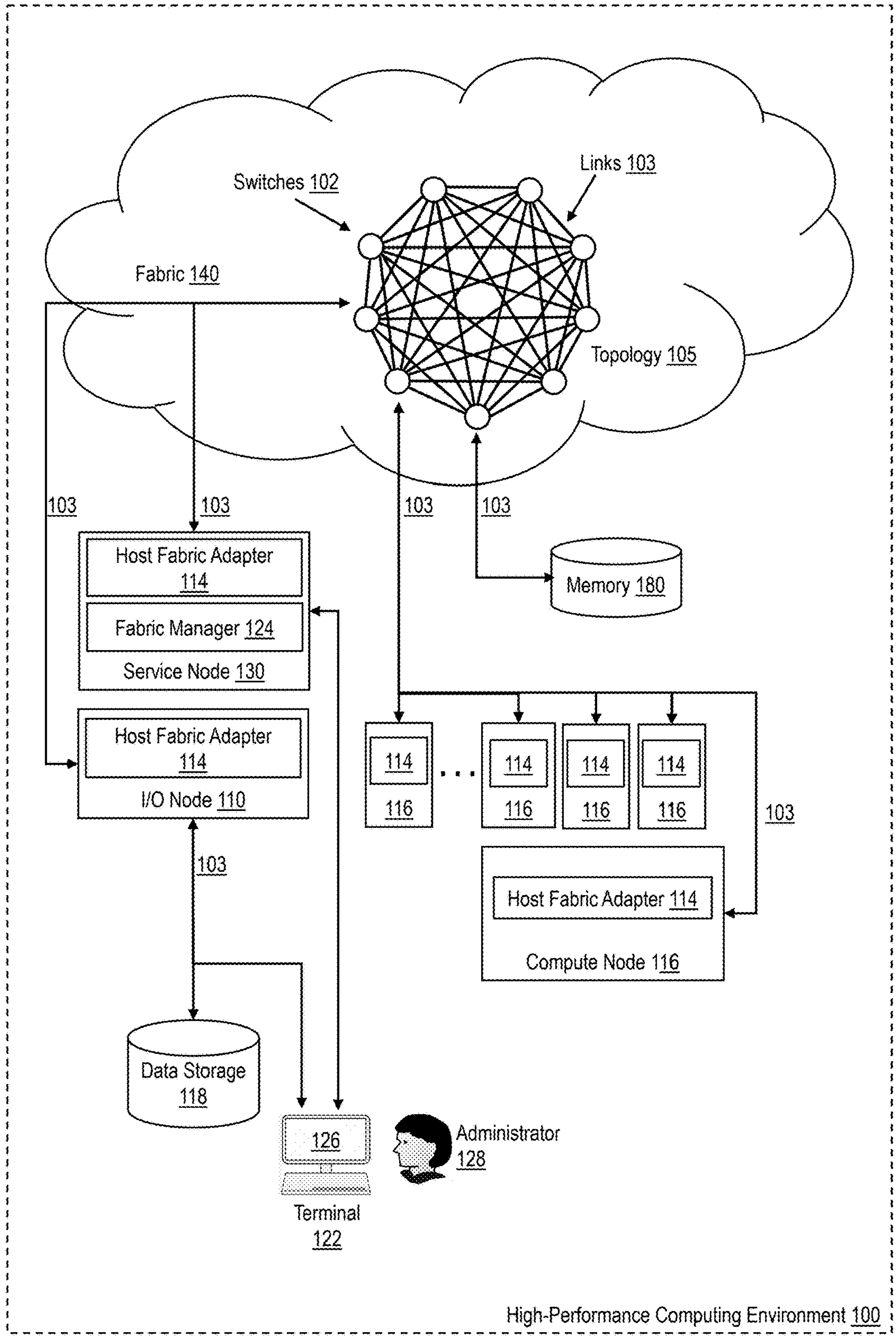
FIG. 1 sets forth a system diagram of an example high-performance computing environment for as-needed forward error correction according to embodiments of the present invention.

Methods, systems, and devices for as-needed forward error correction according to embodiments of the present invention are described with reference to the attached drawings. FIG. 1 sets forth a system diagram of an example high-performance computing environment. The example high-performance computing environment of FIG. 1 includes a fabric (140) which includes an aggregation of switches (102), links (103), and host fabric adapters (HFAs) (114) integrating the fabric with the devices that it supports. The fabric (140) according to the example of FIG. 1 is a unified computing system that includes interconnected nodes and switches that often look like a weave or a fabric when seen collectively.

The switches (102) and the HFAs (114) of the fabric (140) of FIG. 1 are connected to other switches with links (103) to form one or more topologies. A topology is a wiring pattern among switches, HFAs, and other components and routing algorithms used by the switches to deliver packets to those components. Switches, HFAs, and their links may be connected in many ways to form many topologies, each designed to optimize performance for their purpose. Examples of topologies useful according to embodiments of the present invention include HyperX topologies, Star topologies, Dragonflies, Megaflies, Trees, Fat Trees, and many others.

Links (103) may be implemented as copper cables, fiber optic cables, and others as will occur to those of skill in the art. Double density cables may also provide increased bandwidth in the fabric. Such double density cables may be implemented with optical cables, passive copper cables, active copper cables and others as will occur to those of skill in the art.

The switches (102) of FIG. 1 are multiport modules of automated computing machinery, hardware and firmware, which receive and transmit packets. Typical switches receive packets, inspect packet header information, and transmit the packets according to routing tables configured in the switch. Often switches are implemented as, or with, one or more application specific integrated circuits ('ASICs'). In many cases, the hardware of the switch implements packet routing and firmware of the switch configures routing tables, performs management functions, fault recovery, and other complex control tasks as will occur to those of skill in the art.

The compute nodes (116) of FIG. 1 operate as individual computers including at least one central processing unit ('CPU'), volatile working memory and non-volatile storage. The hardware architectures and specifications for the various compute nodes vary and all such architectures and specifications are well within the scope of the present invention as will occur to those of skill in the art. Such non-volatile storage may store one or more applications or programs for the compute node to execute.

Each compute node (116) in the example of FIG. 1 has installed upon it a host fabric adapter (114) ('HFA'). An HFA is a hardware component that facilitates communication between a computer system and a network or storage fabric. It serves as an intermediary between the computer's internal bus architecture and the external network or storage infrastructure. The primary purpose of a host fabric adapter is to enable a computer to exchange data with other devices, such as servers, storage arrays, or networking equipment, over a specific communication protocol. HFAs deliver high bandwidth and increase cluster scalability and message rate while reducing latency.

The example of FIG. 1 includes an I/O node (110) responsible for input and output to and from the high-performance computing environment. The I/O node (110) of FIG. 1 is coupled for data communications to data storage (118) and a terminal (122) providing information, resources, UI interaction and so on to an administrator (128).

The example of FIG. 1 includes a service node (130). The service node (130) provides services common to pluralities of compute nodes, loading programs into the compute nodes, starting program execution on the compute nodes, retrieving results of program operations on the compute nodes, and so on. The service node communicates with administrators (128) through a service application interconnect that runs on computer terminal (122).

A switch and an HFA or two switches when connected by a link are called link partners. As mentioned above, link-level errors occur and FEC is a technique used to detect and correct such errors. Routing all traffic through FEC logic increases latency but the highest-latency portion of forward error correction is the act of locating and correcting the bit errors in the data. The detection portion, on the other hand, is fast. The FEC codes can be used to quickly detect whether there are any errors in a codeword—on the order of single digits of nanoseconds.

To take advantage of the fast detection portion of FEC and avoid the latency of correction, the switches and HFAs of the of FIG. 1 selectively transmit errorless traffic routed through a bypass pipeline rather than a higher-latency FEC pipeline. Each switch (102) and HFA (114) in the example of FIG. 1 includes as-needed FEC encoder and an as-needed FEC decoder providing forward error correction according to the present invention. More particularly, the FEC decoder includes a forward error correction pipeline, a bypass pipeline, and bypass selection logic configured to selectively transmit errorless codewords from the bypass pipeline.

A codeword is a sequence of bits or symbols used to represent data in a manner that allows for error detection and correction. Data is encoded into codewords by adding redundancy through an encoding process. The redundancy added during the encoding process allows the system to detect and, in some cases, correct errors that occur during transmission.

A bubble codeword in this disclosure means a codeword having characteristics that can be identified by a FEC decoder for as-needed FEC according to the present invention—as opposed to a codeword containing data for transmission. A bubble codeword does not contain any information needed by higher layers of the network. Bubble codewords can be discarded by the receiver without adversely affecting the link performance or data transmission of the network. Examples of bubble codewords include idle traffic, which naturally occur when there is no data to be sent, alignment markers such as occur in Ethernet, and other Physical layer artifacts as would occur to one skilled in the art.

Switches and HFAs of FIG. 1 transmit errorless codewords from a bypass pipeline rather than a FEC correction pipeline until a codeword with an error is received. Upon receiving a codeword with an error, traffic is routed through a FEC correction pipeline until a bubble codeword is received. Upon receiving a bubble codeword, traffic is again transmitted from the bypass pipeline until a codeword with an error is received. In this way, all errorless traffic between a bubble codeword and an error is transmitted from the bypass pipeline thereby reducing the latency of the switches and HFAs of the present invention.

As discussed below, some aspects of as-needed forward error correction according to the present invention are configurable. For example, the manner in which bubble codewords are inserted into the data stream for as-need FEC is, in some embodiments, configurable. In the example of FIG. 1, bubble codeword configurations may be established and managed by an administrator. The service node (130) of FIG. 1 has installed upon it a fabric manager (124) for configuring, monitoring, managing, maintaining, troubleshooting, and otherwise administering elements of the fabric (140). The example fabric manager (124) is coupled for data communications with a user interface (126) allowing administrators (128) to configure and administer aspects of as-needed forward error correction according to the present invention.

Figure 2:
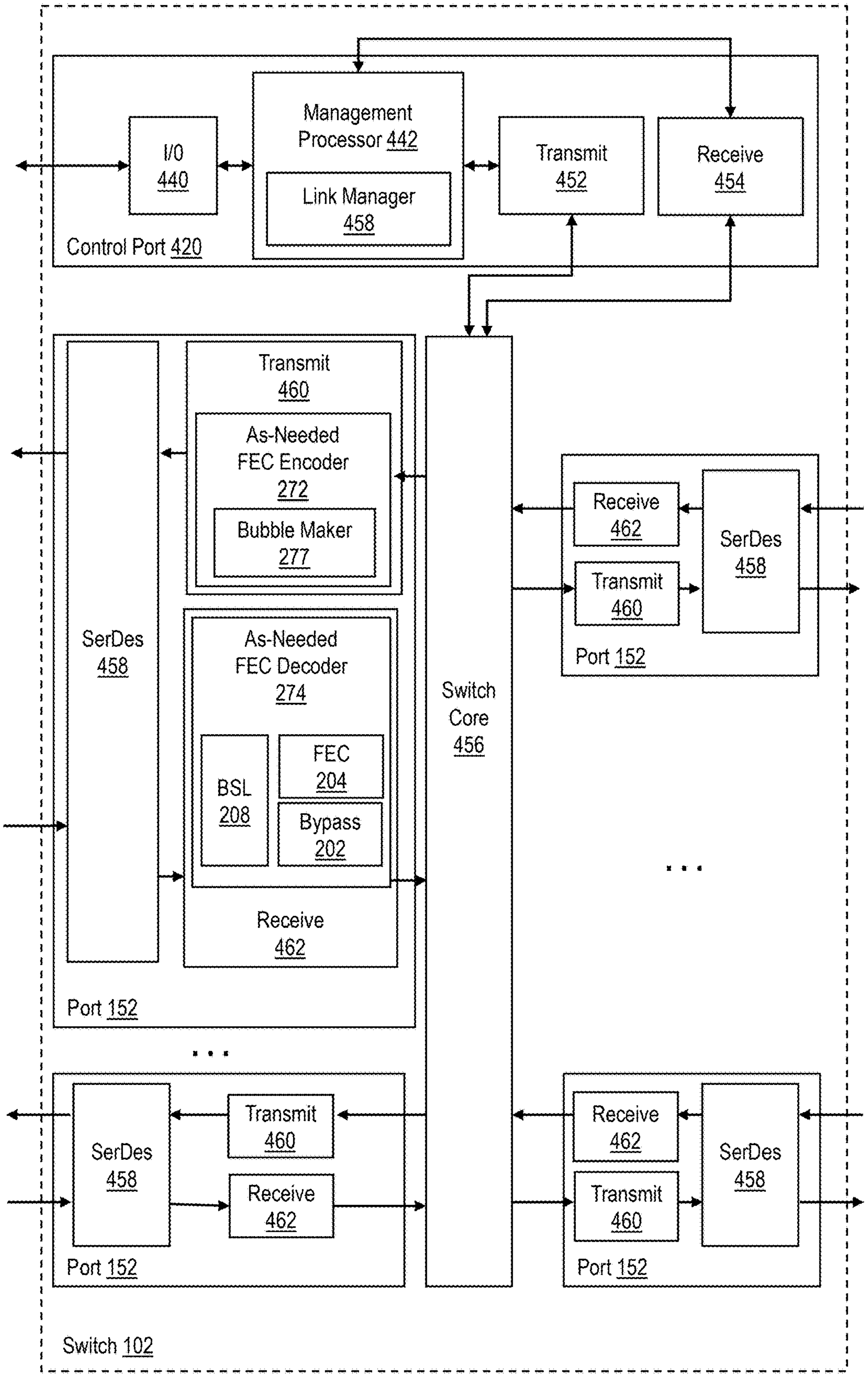
FIG. 2 sets forth a line drawing of a switch configured for as-needed forward error correction according to example embodiments of the present invention.

For further explanation, FIG. 2 sets forth a block diagram of an example switch capable of as-needed FEC according to embodiments of the present invention. The example switch (102) of FIG. 2 includes a control port (420), a switch core (456), and a number of ports (152). Each port (152) is coupled with the switch core (456) and includes a transmit controller (460) and a receive controller (462) and a SerDes (458).

The control port (420) of FIG. 2 includes an input/output ('I/O') module (440), a management processor (442), a transmit controller (452), and a receive controller (454). The management processor (442) of the example switch of FIG. 2 maintains and updates routing tables for the switch. The management processor is also responsible for updating the as-needed FEC configurations according to embodiments of the present invention.

The receive controller (462) of FIG. 2 includes an as-needed FEC decoder (274) that includes a forward error correction pipeline (204), a bypass pipeline (202); and bypass selection logic (208). The forward error correction pipeline (204) may employ correction algorithms such as Reed-Solomon or low-density parity-check (LDPC), or other algorithms to identify and fix bit errors as will occur to those of skill in the art. The bypass pipeline (202) includes a series of buffers sized according to the size of the codeword with little or no error correction and therefore less latency.

The bypass selection logic (208) is configured to receive codewords into both the FEC pipeline (204) and a bypass pipeline (202) and determine whether the codeword has an error and whether the codeword is a bubble codeword. If the codeword has an error, the bypass selection logic (208) selects the FEC pipeline (204) for transmission of the corrected codeword and continues transmitting subsequent codewords from the FEC pipeline (204) until a bubble codeword is received. If the codeword does not have an error and the codeword is a bubble codeword, the bypass selection logic (208) selects the bypass pipeline (202) for transmission and continues transmitting subsequent codewords from the bypass pipeline.

The bypass pipeline (202) is also configured to skip the processing of bubble codewords themselves upon identifying them. Instead of wasting cycles on the bubble, the system immediately shifts focus to the next valid codeword in the sequence. The bypass pipeline then transmits the data from this next codeword with little or no error correction.

Each bubble codeword in the data stream is an opportunity to improve or make up latency by triggering the selection of the bypass pipeline, skipping to the next codeword and therefore making up the latency of processing a codeword, or both. As such, it is useful to strategically insert bubble codewords in the data stream. The transmit controller (460) of FIG. 2 includes an as-need FEC encoder (272) that includes a bubble maker (277), logic for inserting bubble codewords into the data stream. The as-need FEC encoder (272) may be configured to transmit bubble codewords at the request from a link partner, in dependence upon inactivity of the port, periodically, through the use of link-level artifacts and in other ways as will occur to those of skill in the art.

Figure 3:
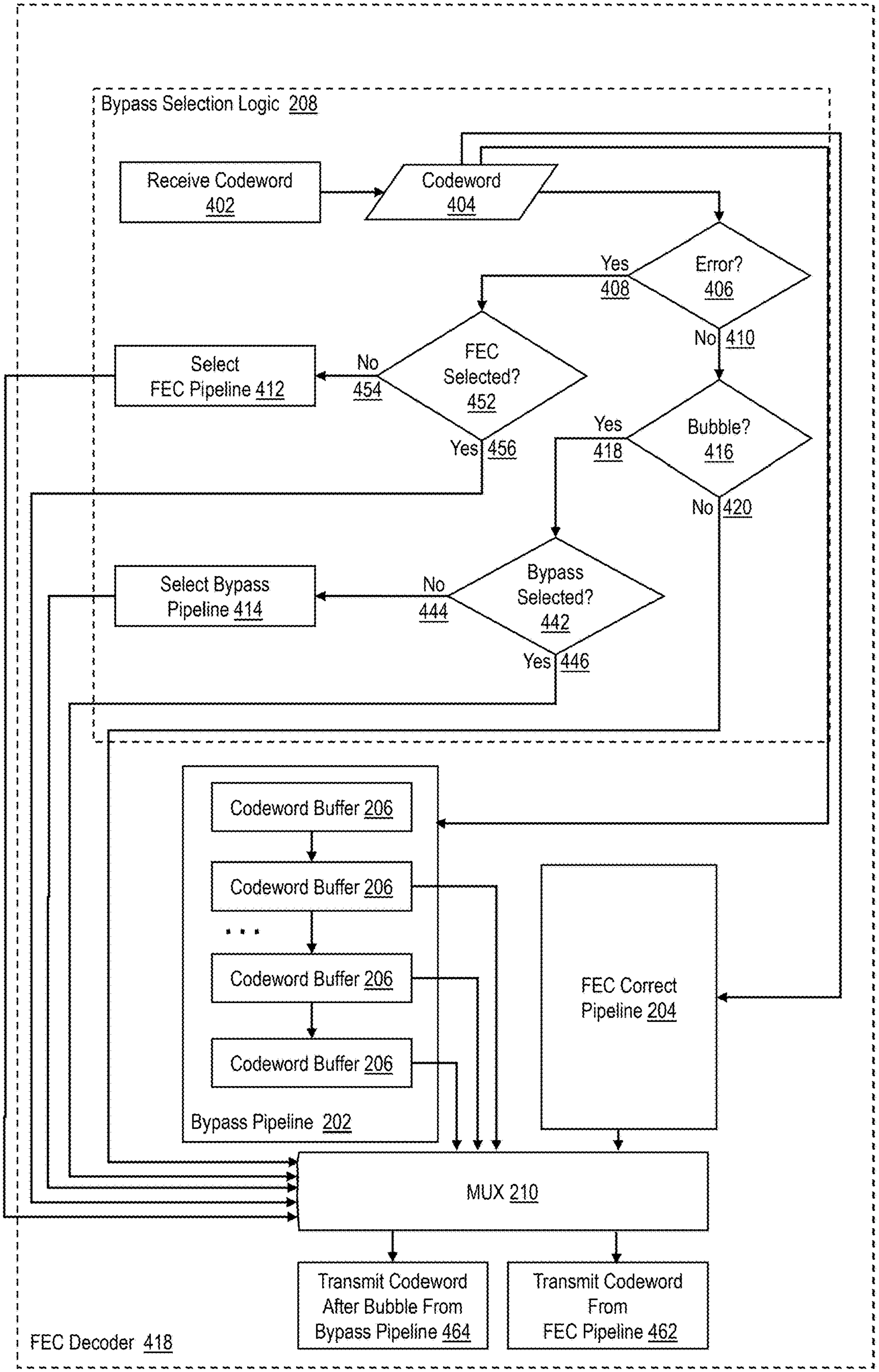
FIG. 3 sets forth a flowchart illustrating an example method for as-needed forward error correction according to embodiments of the present invention.

For further explanation, FIG. 3 sets forth a flow chart illustrating an example method of as-needed FEC according to embodiments of the present invention. The method of FIG. 3 includes receiving (402) a codeword (404) into both a FEC pipeline (204) and a bypass pipeline (202). The FEC pipeline (204) includes logic employing correction algorithms.

The bypass pipeline (202) includes a series of buffers (206) sized according to the size of the codeword with little or no error correction and therefore less latency. The bypass pipeline (202) is also configured to skip the processing of bubble codewords themselves upon identifying them. Instead of wasting cycles on the bubble, the system immediately shifts focus to the next valid codeword in the sequence. The bypass pipeline then transmits the data from this next codeword with little or no error correction.

By receiving the codeword into both the FEC pipeline (204) and the bypass pipeline, the codeword may be processed by the FEC pipeline and corrected prior to transmission if it has an error or, in certain circumstances, transmitted from a bypass pipeline with reduced latency if it does not have an error. Subsequent codewords are transmitted from the selected pipeline until a pipeline switching event occurs such as receiving a bubble codeword or a codeword with an error.

The method of FIG. 3 includes determining (406) whether the codeword has an error. Determining (406) whether the codeword has an error may be carried out through a syndrome calculation, which involves using the redundant bits to identify discrepancies between the received data and what was expected. If the syndrome is non-zero, it indicates that errors are present.

If the codeword has an error (408), the method of FIG. 3 includes determining (452) whether the FEC pipeline is selected. If the FEC pipeline is not selected (454), the method of FIG. 3 includes selecting (412) the FEC pipeline (204) and transmitting (462) the codeword from the FEC pipeline (204). If the FEC pipeline is already selected (456), the method of FIG. 3 includes transmitting (462) the codeword from the FEC pipeline. The method of FIG. 3 continues transmitting codewords from the FEC pipeline until a bubble codeword is received.

If the codeword does not have an error (410), the method of FIG. 3 includes determining (416) whether the codeword (404) is a bubble codeword (418). If the codeword (404) is a bubble codeword (418), the method of FIG. 3 includes determining (442) whether the bypass pipeline (202) is selected for transmission. If the bypass pipeline (202) is not selected for transmission (444), the method of FIG. 3 includes selecting (414) the bypass pipeline (202) for transmission and transmitting (464) the codeword after the bubble codeword from the bypass pipeline (202). In the example of FIG. 3, the multiplexer (210) selects the bypass pipeline (202) and transmits (464) the codeword after the bubble codeword, skipping the bubble codeword itself, thereby saving the latency of processing the bubble codeword and making up some of the latency of processing of a past errored codeword.

If the codeword (404) is a bubble codeword (418) and the bypass pipeline (202) is selected for transmission (446), the method of FIG. 3 includes transmitting (464) the codeword after the bubble codeword from the bypass pipeline (202). Codewords are transmitted from the bypass pipeline until a codeword with an error is detected. Furthermore, because the bypass pipeline is configured to skip the processing of bubble codewords, each bubble codeword received when the bypass filter is already selected is an opportunity to make up past latency caused by FEC.

If the codeword (404) is not a bubble codeword (420) and the codeword has no errors (410), the method of FIG. 3 continues by transmitting the codeword from whichever pipeline is currently selected. That is, errorless codewords that are not bubble codewords are transmitted from the pipeline currently selected. If the bypass pipeline is currently selected, the method of FIG. 3 continues by transmitting (464) the errorless codeword from the bypass pipeline. If the FEC pipeline is currently selected, the method of FIG. 3 includes transmitting (462) the errorless codeword from the FEC pipeline (462).

A link partner implementing as-needed FEC according to embodiments of the present invention can be a switch or an HFA. For further explanation, FIG. 4 sets forth a block diagram of a compute node including a host fabric adapter (114) according to embodiments of the present invention. The compute node (116) of FIG. 4 includes processing cores (602), random access memory ('RAM') (606) and a host fabric adapter (114).

Stored in RAM (606) in the example of FIG. 3 is an application (612), a parallel communications library (610), an OpenFabrics Interface module (622), and an operating system (608). Applications for high-performance computing environments, artificial intelligence, and other complex environments are often directed to computationally intense problems of science, engineering, business, and others. A parallel communications library (610) is a library specification for communication between various nodes and clusters of a high-performance computing environment. A common protocol for HPC computing is the Message Passing Interface ('MPI'). OpenFabrics Interfaces (OFI), developed under the OpenFabrics Alliance, is a collection of libraries and applications used to export fabric services.

Figure 4:
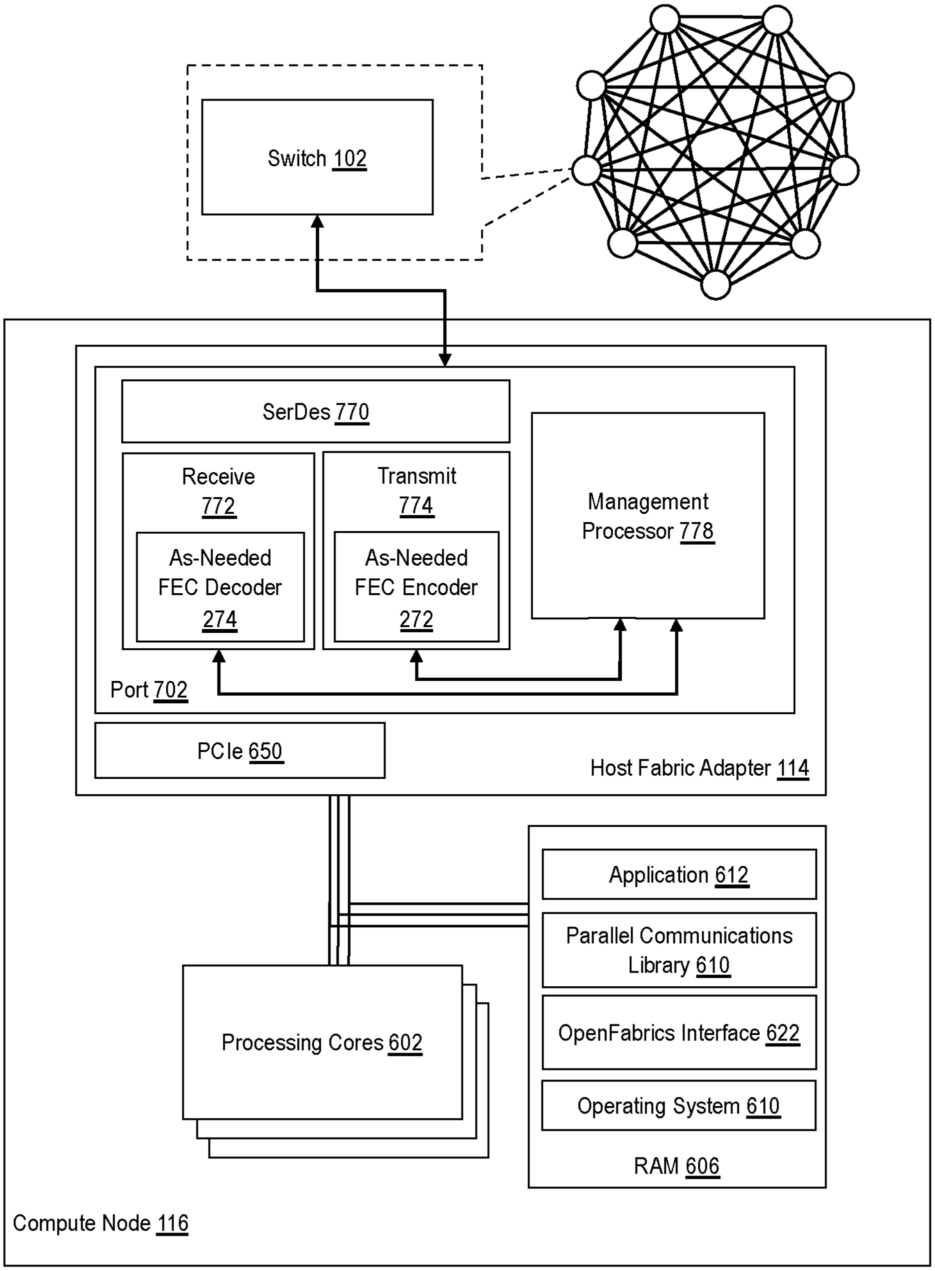
FIG. 4 sets forth a block diagram of a compute node configured for as-needed forward error correction according to embodiments of the present invention.

The compute node of FIG. 4 includes a host fabric adapter (114). The HFA (114) of FIG. 4 includes a PCIe interconnect (650) or other such interconnect as will occur to those of skill in the art and a fabric port (702). The port (702) is coupled for data communications with a link partner, switch (102). The port (702) includes a management processor (778), a serializer/deserializer (770); a receive controller (772) and a transmit controller (774).

The receive controller (772) includes an as-needed forward error correction decoder (274). The as-need FEC decoder (274) includes a forward error correction pipeline, a bypass pipeline; and bypass selection logic configured to selectively transmit errorless codewords from the bypass pipeline according to embodiments of the present invention as described above with reference to FIGS. 1-3.

The transmit controller (774) includes an as-needed FEC encoder (272) configured to transmit bubble codewords for as-needed FEC according to the present invention as described above. Those of skill in the art will recognize that bubble codewords in the data stream serve to reduce traffic routed through the FEC pipeline by providing a trigger to transmit errorless traffic from the bypass pipeline with little or no corection until a codeword with an error is received. Furthermore, each bubble codeword received while the bypass pipeline is select serves to allow the receiver to "make up" latency by skipping the bubble codeword and processing the next codeword. As such, in is useful to strategically insert bubble codewords in the data stream.

One way of generating bubble codewords in the data stream includes configuring a receive controller to request a bubble codeword from a link partner. Such a request may occur as the result of detecting an error, inactivity of the port, or periodically as will occur to those of skill in the art.

Bubble codewords can also be inserted in the data without a request. These are referred to as natural bubbles. Alignment markers and other link-level artifacts may be used as or used to trigger the creation of bubble codewords. Alignment markers are special sequences of bits inserted into the data stream at regular intervals. The receiving hardware or software looks for these markers to confirm that it is properly synchronized with the incoming data stream. Once the marker is detected, the receiver can align itself to the start of a frame or a particular portion of the data. Rules may be configured to strategically insert bubble codewords in dependence upon the detection of such alignment markers. Other link-level artifacts that may be used in this manner to facilitate inserting bubble codewords in the data stream include comma characters, frame check sequences, idle characters and others as will occur to those of skill in the art.

In some embodiments, the transmitter may coalesce multiple artifacts, such as idles, into a single bubble codeword. In other cases, the receiver may recognize an artifact as something that can be skipped in the data processing, thereby treating it as if it was a bubble codeword Bubble codewords may also be inserted into the data stream in dependence upon bit error rate. Bubble codewords may be inserted into the data stream with a periodicity correlated to an observed bit error rate instead of correlating to specific error events. Bubble code words may be inserted when bit error rate exceed a particular threshold, in dependence upon events that cause higher BER, or other attributes of BER that will occur to those of skill in the art.

As-needed FEC attributes and policies may be configured through various user facing controls, to allow the user to optimize for bandwidth or latency.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A switch, the switch comprising:

at least one port; a serializer/deserializer; a receive controller and a transmit controller; and a switch core;

wherein the receive controller comprises an as-needed forward error correction decoder comprising a forward error correction pipeline, a bypass pipeline; and bypass selection logic configured to selectively transmit errorless codewords from the bypass pipeline.

2. The switch of claim 1, wherein the bypass selection logic is configured to:

receive a codeword into both the FEC pipeline and the bypass pipeline;

determine whether the codeword has an error;

if the codeword has an error, determine whether the FEC pipeline is selected, if the FEC pipeline is not selected, select the FEC pipeline and transmitting the codeword from the FEC pipeline;

if the FEC pipeline is selected, transmit the codeword from the FEC pipeline;

if the codeword does not have an error, determine whether the codeword is a bubble codeword, if the codeword is a bubble codeword, determine whether the bypass pipeline is selected for transmission;

if the bypass pipeline is not currently selected for transmission, select the bypass pipeline for transmission and transmitting the codeword after the bubble codeword from the bypass pipeline; and if the bypass pipeline is currently selected for transmission, transmit the codeword after the bubble codeword from the bypass pipeline.

3. The switch of claim 2 wherein the bypass selection logic is configured to transmit the codeword from the currently selected pipeline if the codeword is not a bubble codeword and the codeword has no errors.

4. The switch of claim 1 wherein the bypass pipeline includes a series of buffers sized in dependence upon the length of the codeword.

5. The switch of claim 1 wherein the transmit controller comprises an as-needed FEC encoder configured to transmit a bubble codeword to a link partner.

6. The switch of claim 5 wherein the as-needed FEC decoder is configured to send a bubble request to a link partner; and wherein the as-needed FEC encoder is configured to send a bubble codeword to a link partner in response to a bubble request.

7. The switch of claim 5 wherein the as-needed FEC encoder is configured to transmit a bubble codeword to a link partner in dependence upon port inactivity.

8. The switch of claim 5 wherein the as-needed FEC encoder is configured to transmit a bubble codeword to a link partner in dependence upon link-level artifacts.

9. A method of forward error correction, the method comprising:

receiving a codeword into both a FEC pipeline and a bypass pipeline;

determining whether the codeword has an error and determining whether the codeword is a bubble codeword;

if the codeword has an error, selecting the FEC pipeline for transmission of the corrected codeword and transmitting subsequent codewords from the FEC pipeline until a bubble codeword is received;

if the codeword does not have an error and the codeword is a bubble codeword, selecting the bypass pipeline for transmission and transmitting subsequent codewords from the bypass pipeline, beginning with the codeword after the bubble codeword, until a codeword with an error is received.

10. The method of claim 9 further comprising transmitting the codeword from the current pipeline if the codeword does not have an error and the codeword is not a bubble codeword.

11. The method of claim 9 further comprising requesting from, a sending switch, a bubble codeword if the codeword has an error.

12. The method of claim 9 further comprising periodically transmitting a bubble codeword.

13. The method of claim 9 further comprising transmitting a bubble codeword in dependence upon bit error rate.

14. A forward error correction decoder comprising:

a forward error correction pipeline;

a bypass pipeline; and bypass selection logic configured to selectively transmit errorless codewords from the bypass pipeline.

15. A method of as-needed forward error correction ("FEC"), the method comprising:

receiving a codeword into both a FEC pipeline and the bypass pipeline;

determining whether the codeword has an error;

if the codeword has an error, determining whether the FEC pipeline is selected, if the FEC pipeline is not selected, selecting the FEC pipeline and transmitting the codeword from the FEC pipeline;

if the FEC pipeline is selected, transmitting the codeword from the FEC pipeline;

if the codeword does not have an error, determining whether the codeword is a bubble codeword;

if the codeword is a bubble codeword, determining whether the bypass pipeline is selected for transmission;

if the bypass pipeline is not currently selected for transmission, selecting the bypass pipeline for transmission and transmitting the codeword after the bubble codeword from the bypass pipeline; and if the bypass pipeline is currently selected for transmission, transmitting the codeword after the bubble codeword from the bypass pipeline.

16. The method of claim 15 further comprising transmitting the codeword from the selected pipeline if the codeword is not a bubble codeword and the codeword has no errors.

17. The method of claim 15 further comprising requesting from, a link partner, a bubble codeword in response to receiving a codeword with an error.

18. The method of claim 15 further comprising periodically transmitting a bubble codeword.

19. The method of claim 15 further comprising inserting a bubble codeword in dependence upon bit error rate.

20. The method of claim 15 further comprising inserting a bubble codeword in dependence upon port inactivity.

* * * * *